May 15, 1928.
H. J. HADDICK
BASE PAN FOR PORTABLE OIL STOVES
Filed July 28, 1926
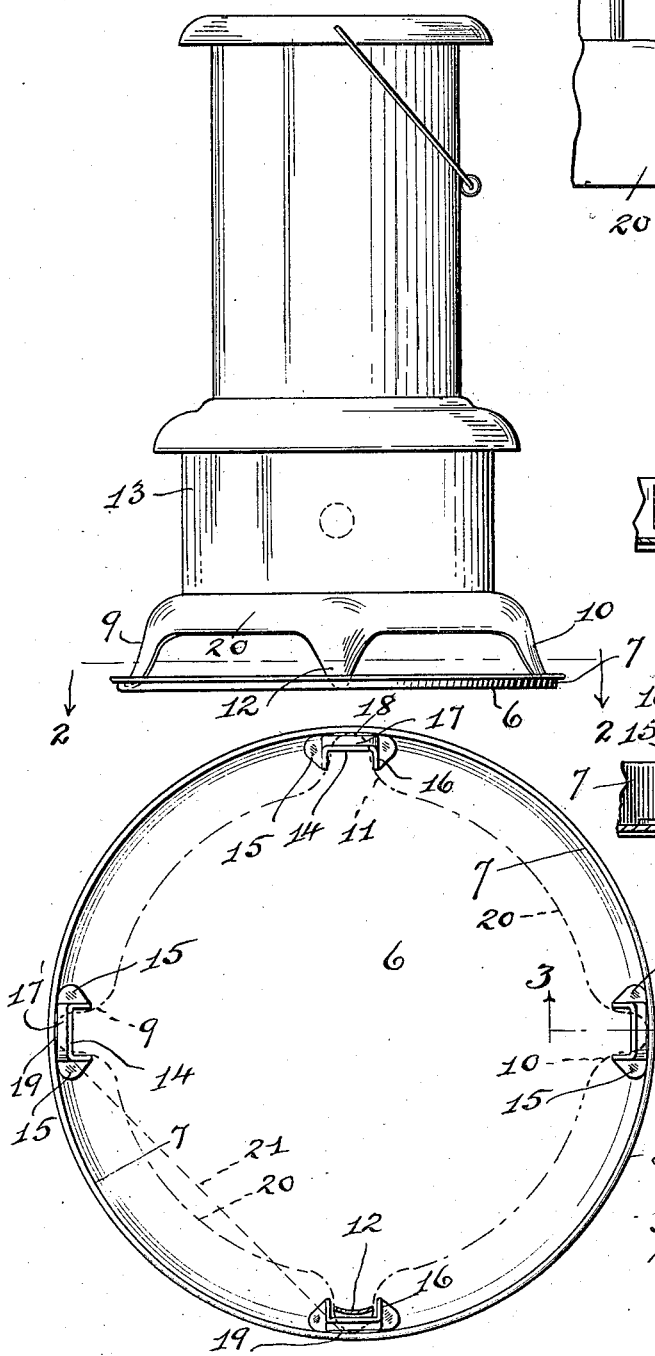
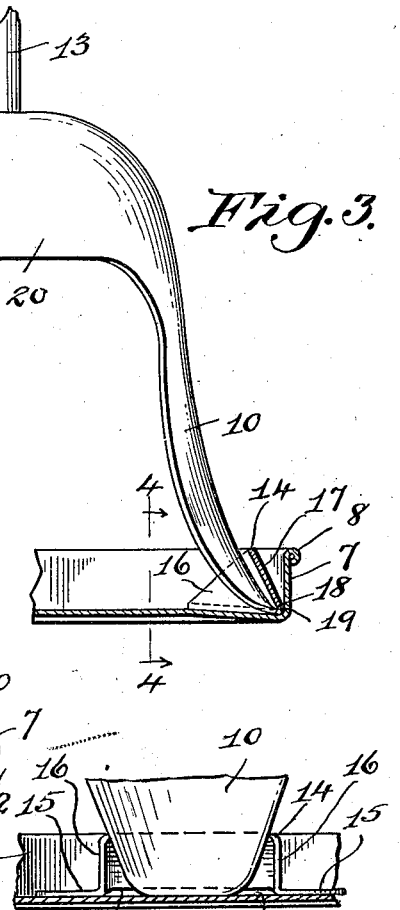
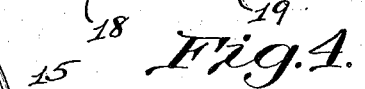
Inventor
Henry J. Haddick
By Charles B. Mann Jr.
Attorney Patented May 15, 1928.

1,670,148

UNITED STATES PATENT OFFICE.

HENRY J. HADDICK, OF BALTIMORE, MARYLAND, ASSIGNOR TO NATIONAL ENAMELING AND STAMPING COMPANY, OF MILWAUKEE, WISCONSIN, A CORPORATION OF NEW JERSEY.

BASE PAN FOR PORTABLE OIL STOVES.

Application filed July 28, 1926. Serial No. 125,347.

This invention relates to an improved base pan for oil stoves and has for its object to provide a novel pan upon which an oil stove may readily be placed and attached, and which pan will be held against displacement from the stove when the latter is lifted or moved from one place to another.

The invention is particularly useful in connection with light-weight stoves, such as portable heating stoves, to prevent the dropping of oil or charred wick-particles upon rugs, carpets or the floor during the filling or wick-cleaning or trimming operations.

The main object of the invention is to provide an improved base-pan of sheet-metal and of a circular shape so that the structure will be free of angular corners; which pan will be of a greater diameter than the body of the stove whereby to provide a complete protection on the floor in that there will be no overhanging portion of the stove body in a vertical plane beyond the outer rim-edge of the pan as there would be in the case of a rectangular pan, and to provide improved means for engaging the legs of the stove to secure the pan and stove-legs together.

The invention is illustrated in the accompanying drawing, wherein,—

Fig. 1 shows an oil stove seated upon and engaging the improved pan.

Fig. 2 illustrates the pan in top view.

Fig. 3 shows the pan in cross-sectional detail and on an enlarged scale with a leg of the stove engaging the pan,—the section being taken on the line 3—3 of Fig. 2, and Fig. 4 shows another sectional detail through the pan and viewing the leg of the stove on the line 4—4 of Fig. 3.

In the drawing, the numeral 6 designates the bottom of the base-pan having an upstanding annular vertical flange 7, which latter extends all the way around the pan bottom to produce a shallow pan receptacle.

The annular up-standing vertical flange 7 is rolled or curled outwardly at 8 to reinforce and finish the upper edge of the flange.

The pans are designed to fit the feet of an oil stove which is to be placed thereon and with this in view, the diameter of the pan between the inner sides of the up-standing annular vertical flange 7 is slightly less than the normal distance between the lower ends of diagonal stove-feet 9 and 10 of the oil stove 13.

On the top surface of the pan bottom 6, and immediately at the inner side of the annular vertical flange 7, I provide, in this instance four clip plates 14,—one for each foot 9, 10, 11 and 12 of the oil stove.

Each clip-plate 14, has two flat base-ears 15; two vertical side walls 16 and an inclined wall 17 whose lower edge 18 is slightly spaced or elevated with respect to the under or seating surfaces of the base-ears.

These clip-plates are placed on the bottom of the pan immediately at the inner side of the annular vertical flange 7 and the two base-ears 15, are permanently secured to the pan-bottom preferably by spot welding, so that the clip-plates are rigidly secured in place on the bottom of the pan.

When the clip-plates are in place, the lower edge 18 of each clip-wall 17 will be slightly elevated from the bottom 6 of the pan and will be slightly spaced from the bend or angle formed at the junction between the pan bottom 6 and the annular vertical flange 7 as can be seen in Figs. 2, 3 and 4 of the drawings.

The spacing therefore of the edge 18 of the clip wall from the pan-bottom produces a slot 19 beneath said edge 18 for a purpose that will be explained.

The stove feet 9, 10, 11 and 12 of these portable oil stoves are usualy formed of a heavy sheet-metal and are therefore capable of being readily sprung.

The feet extend downwardly and outwardly from the ring-plate 20, to which they are attached so that the distance from the lower end of one foot, such as foot 9, to the lower end of the diametrically-opposite foot 10, is greater than the diameter of the ring 20.

This fact makes it important that the pan be of a diameter substantially equal to the distance betwen diametrically-opposed feet because it is important that there be no portion of the stove body or ring 20 that will overhang or project beyond the flange 7 of the pan, for if such a condition prevailed, oil might drop from such overhanging portion onto a rug or floor instead of into the pan itself and the very purpose of the pan would be defeated.

This would be particularly true if the pan were rectangular and the feet 9, 10, 11 and 12 of the stove were confined in the angular corners of the pan because the straight wall of the pan would extend from one foot to the next as indicated by the broken line 21 in Fig. 2 of the drawing, and the ring 20 would thus overhang or project beyond that straight wall.

It is therefore important to the present invention that the pan be circular and of a diameter that will receive the lower ends of the stove feet only when those feet are sprung inward slightly.

By placing the feet under the lower edges 18 of the clip-plates 14 and in the slots 19, which may be done by springing the feet inwardly, the lower edges of the feet will project beneath the said edges 18 at a plurality of points but within the circular flange 7, and the pan and feet will thus be secured together.

When the pan is thus attached to the feet, no portion of the stove will overhang or project over the annular flange 7 and anything that might drop or drip from any part of the stove will be caught in the pan.

Having described my invention, I claim,—

1. A base-pan for receiving the feet of portable oil stoves comprising a circular pan having a continuous up-standing annular flange around its outer edge and a separate and independent clip plate for each leg of the stove each plate being rigidly secured to the upper side of the pan-bottom at the inner side of the annular up-standing flange said clip plates being shaped to receive the feet of an oil stove when the latter are sprung into engagement therewith.

2. A base-pan for receiving the feet of portable oil stoves comprising a circular pan having a continuous annular up-standing flange around its outer edge and a separate and independent clip plate for each stove leg each clip plate having two vertical side walls and an inclined wall supported by the side walls said clip plates being rigidly secured to the pan bottom at the inner side of the up-standing flange and the inclined wall thereof engaging the stove foot when the latter is sprung outwardly thereunder.

In testimony whereof I affix my signature.

HENRY J. HADDICK.